United States Patent [19]

Malhi

[11] Patent Number: 5,789,093
[45] Date of Patent: Aug. 4, 1998

[54] LOW PROFILE FUEL CELL

[75] Inventor: Satwinder Malhi, Garland, Tex.

[73] Assignee: Texas Instruments Incorporated, Dallas, Tex.

[21] Appl. No.: 763,158

[22] Filed: Dec. 10, 1996

[51] Int. Cl.⁶ .................................................. H01M 8/04
[52] U.S. Cl. .................................................. 429/34; 429/39
[58] Field of Search .................................. 429/34, 38, 39

[56] References Cited

U.S. PATENT DOCUMENTS

| | | |
|---|---|---|
| 4,510,212 | 4/1985 | Fraioli .......................... 429/38 X |
| 4,689,280 | 8/1987 | Gionfriddo ........................ 429/34 |
| 4,826,741 | 5/1989 | Aldhart et al. ................. 429/34 X |
| 5,424,144 | 6/1995 | Woods ............................ 429/39 X |
| 5,643,690 | 7/1997 | Tateishi et al. ................... 429/34 |

*Primary Examiner*—Stephen Kalafut
*Attorney, Agent, or Firm*—Ronald O. Neerings; James C. Kesterson; Richard L. Donaldson

[57] ABSTRACT

A fuel cell stack (60) comprises a plurality of manifolds (50) separated by membranes (37). Each manifold (50) forms overlapping chambers (34, 36) for adjacent cells (32) such that the depth of chambers for adjacent cells is not additive. In the preferred embodiment, the manifolds (50) are formed of a plastic material with conductive vias formed therethrough to reduce the cost associated with graphite vias.

20 Claims, 3 Drawing Sheets

1

LOW PROFILE FUEL CELL

BACKGROUND OF THE INVENTION

1. Technical Field

This invention relates in general to fuel cells and, more particularly, to a low profile fuel cell.

2. Description of the Related Art

A fuel cell is an electrochemical device which is able to continuously convert chemical energy to electrical energy. Unlike a battery, which contains a set amount of chemicals for generating electricity and stops delivering electricity once the chemicals are consumed, a fuel cell can deliver electricity continuously so long as it receives fuel and oxidant.

Although many different chemicals can be used as a fuel source, the majority of fuel cells used hydrogen ($H_2$). Other fuel sources are methane and methanol. The oxidant is typically oxygen ($O_2$) which is obtained from air.

Although the concepts behind fuel cells have been known for years, it was not until the 1960s that practical fuel cells were designed, primarily for the space program. Fuel cells have several advantages over batteries. First, they can operate continuously using fuel which is easily stored and an oxidant which is readily available. Second, the byproduct of the chemical reaction in an $H_2/O_2$ cell is pure $H_2O$, so the fuel cell is much more environmentally sound than a battery.

Despite the advantages of the fuel cell, batteries have the advantage that they are easily formed within a small package. Therefore, there use in portable electronic devices, such as notebook computers, has been unchallenged. However, batteries suffer from several problems. First, a rechargeable battery typically has a short life in an electronic device which is used continuously, such as a notebook computer. Even with energy conservation techniques, a battery must be recharged after every two to five hours of use. Second, many batteries develop a "memory" which prevents them from recharging to their original energy capacity. Therefore, a battery which is rated at four hours of continuous use may render significantly less usable energy after a few rechargings. Third, a battery can be recharged a finite number of times before it loses its capacity to hold a charge. At this point, the battery must be discarded, which can have a negative environmental impact.

Therefore, a need has arisen for a low profile, light weight fuel cell for use in a portable electronic device.

SUMMARY OF THE INVENTION

The present invention provides a low profile, low cost fuel cell stack. A plurality of manifolds each form a plurality of adjacent overlapping chambers, such that the depth of chambers for adjacent cells is not additive. Membranes are disposed between manifolds and chemical sources provide chemicals to said chambers.

The fuel cell stack of the present invention provides significant advantages over the prior art. First, because chambers for adjacent cells are not additive in depth, the thickness of the fuel cell stack can be greatly reduced. Further, the manifolds can be cheaply manufactured from a plastic material with conductive vias formed therethrough.

BRIEF DESCRIPTION OF THE DRAWINGS

For a more complete understanding of the present invention, and the advantages thereof, reference is now made to the following descriptions taken in conjunction with the accompanying drawings, in which:

2

Figure 1:
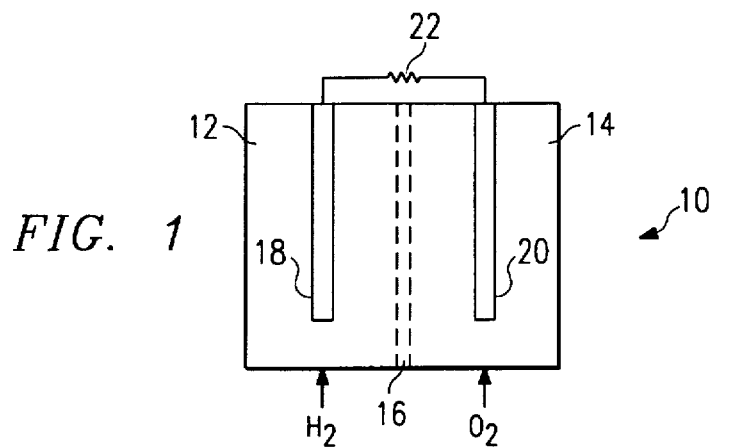
Figure 2:
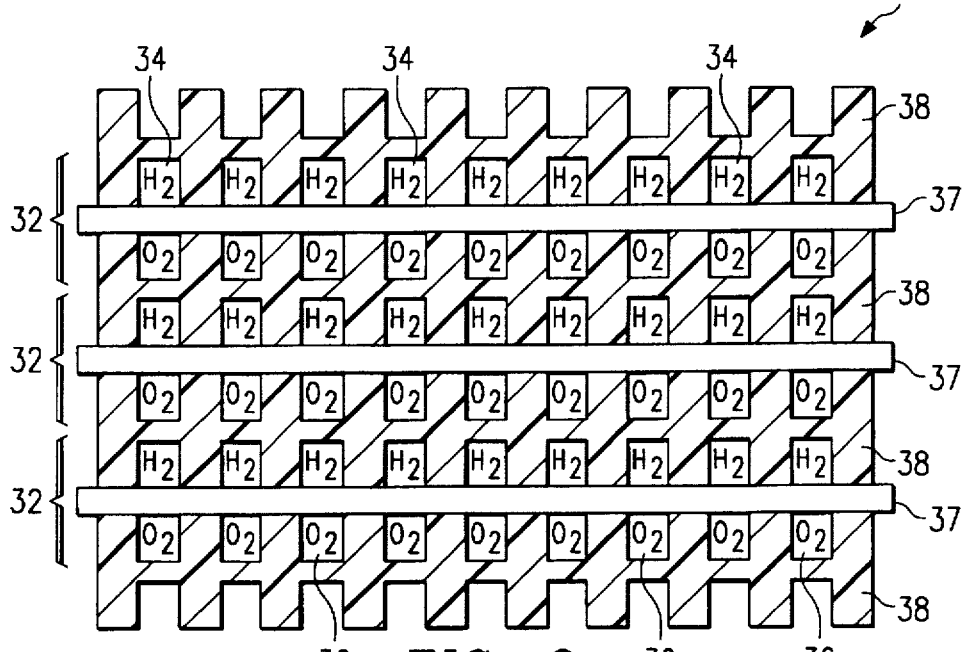
Figure 3:
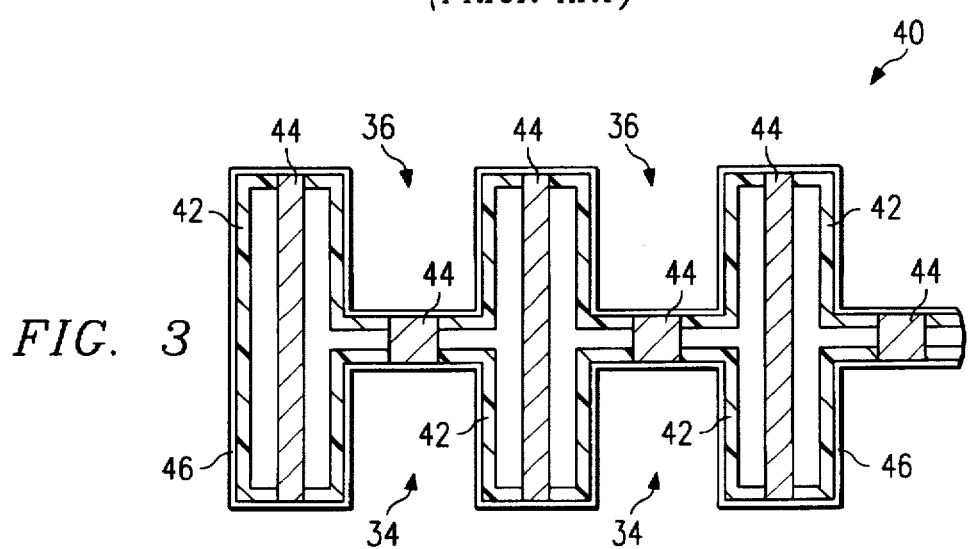
Figure 5A:
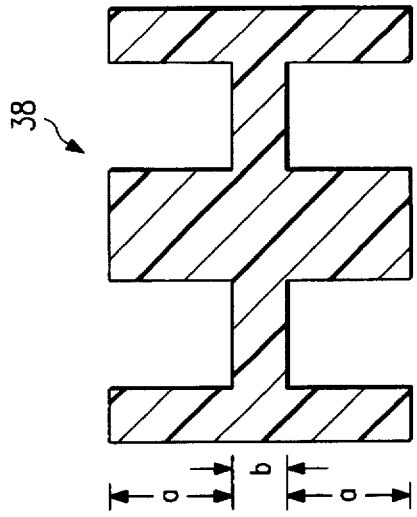
Figure 4:
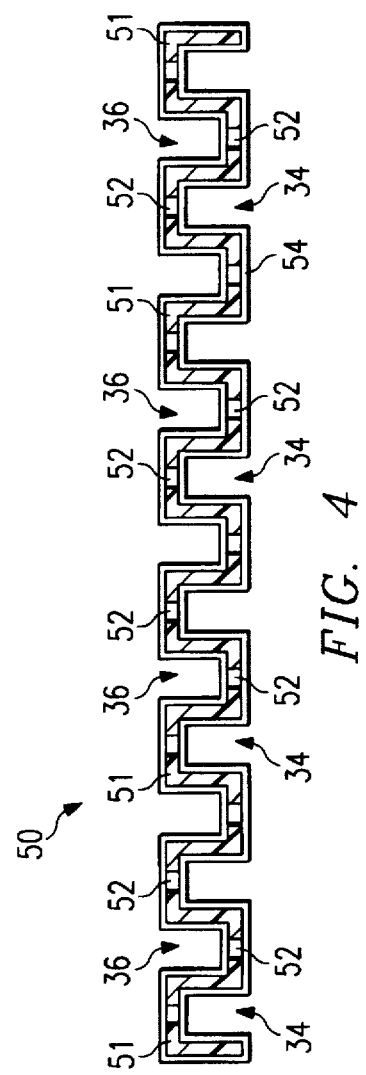
Figure 6:
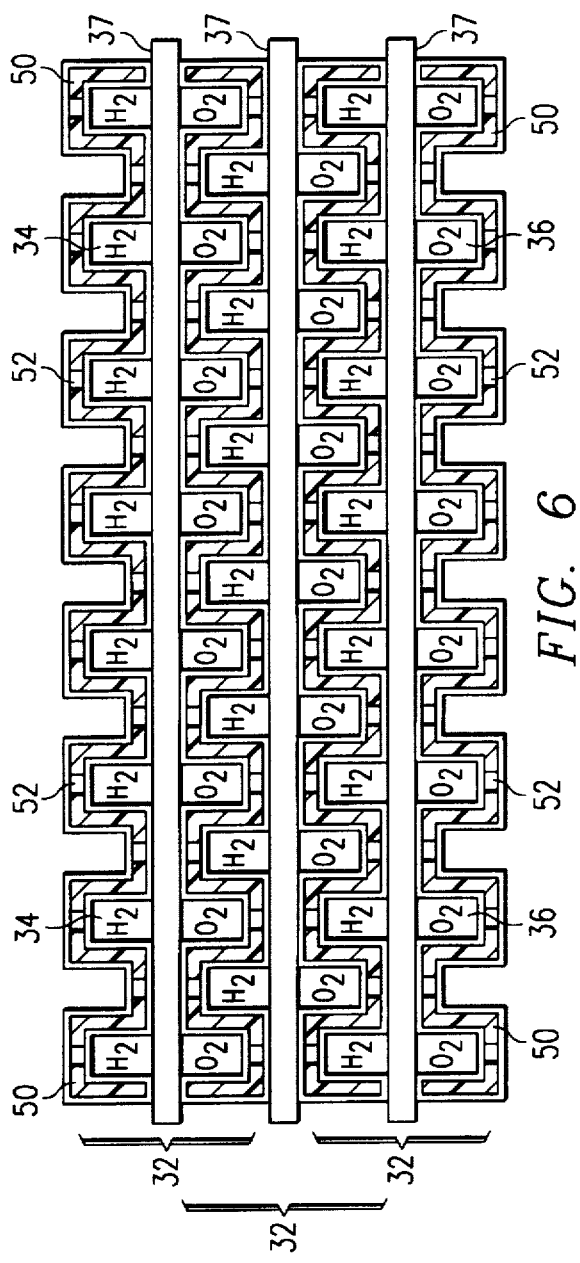
Figure 5B:
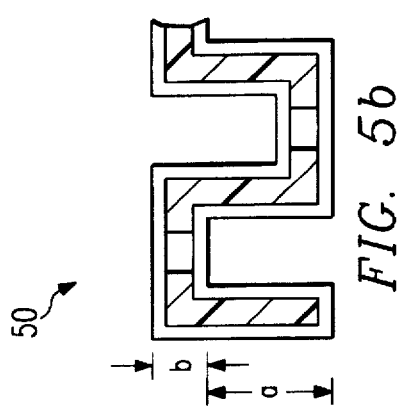
Figure 7:
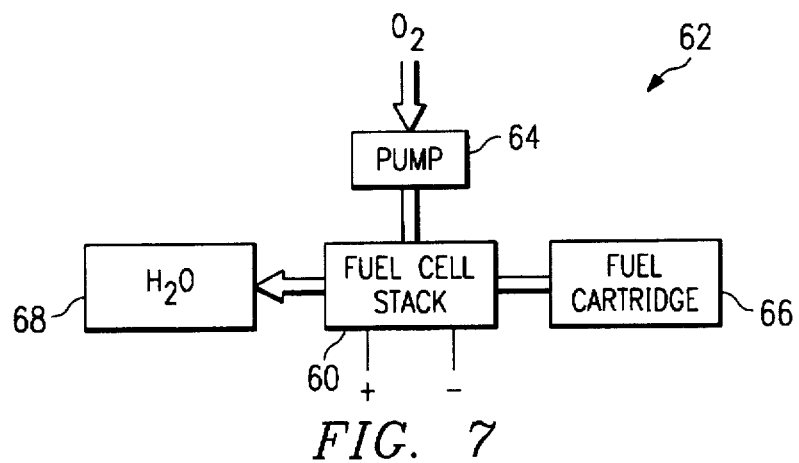

FIG. 1 illustrates the process of generating electricity from a fuel cell;

FIG. 2 illustrates a prior art fuel cell;

FIG. 3 illustrates a first embodiment of a manifold/electrode which can be used to create a low cost, low weight fuel cell;

FIG. 4 illustrates a second embodiment of a manifold/electrode which can be used to create a low profile fuel cell stack;

FIGS. 5a and 5b illustrates a comparison of the depth of a manifold/electrode according to FIG. 4 and the depth of a manifold/electrode according to the prior art of FIG. 2;

FIG. 6 illustrates a fuel cell stack using the manifold/electrode of FIG. 4;

FIG. 7 illustrates a power assembly using the fuel cell stack of FIG. 6; and

Figure 8:
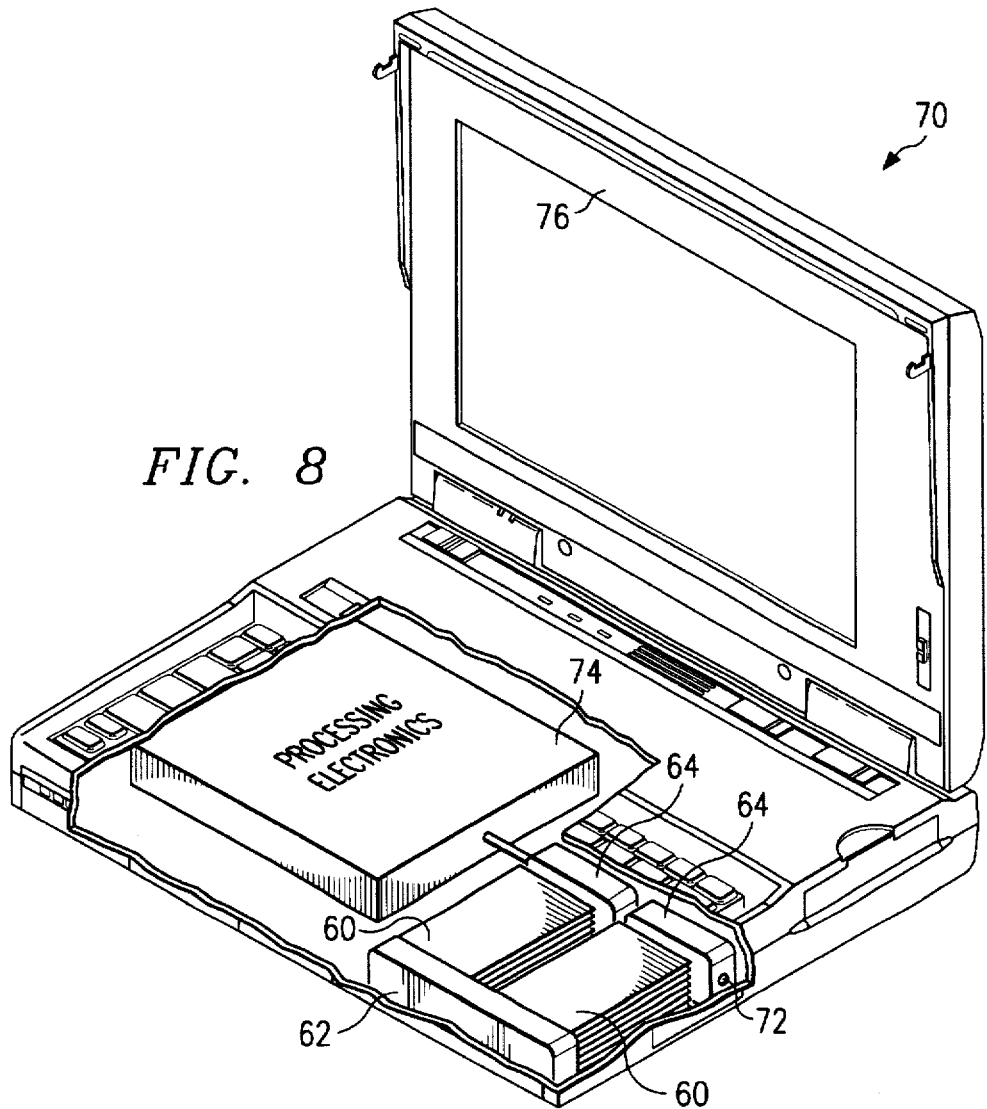

FIG. 8 illustrates a notebook computer incorporating the power assembly of FIG. 7.

DETAILED DESCRIPTION OF THE PREFERRED EMBODIMENT

The present invention is best understood in relation to FIGS. 1–5 of the drawings, like numerals being used for like elements of the various drawings.

FIG. 1 illustrates the process of generating electricity from a fuel cell 10. For this example, $H_2$ is used as the fuel and $O_2$ is used as the oxidant. The hydrogen chamber 12 and the oxygen chamber 14 are separated by a membrane (or electrolyte) 16 coated with a catalyst, such as platinum. The membrane is such that hydrogen ions ($H^+$) can pass through, but hydrogen molecules ($H_2$) cannot. Inert electrodes, such as graphite electrodes, shown as anode 18 and cathode 20, are connected through load 22. Electrodes 18 and 20 are also coated with a catalyst, such platinum.

When the electrodes are connected through load 22, the hydrogen dissociates on the catalytic surface of the anode 18, resulting in hydrogen ions and electrons ($2H_2 \rightarrow 4H^+ + 4e$). The hydrogen ions pass through the membrane to the catalytic surface of the cathode 20 while the electrons pass through the load to the cathode. At the cathode, the oxygen, hydrogen ions and electrons combine at the catalytic surface to form water ($4H^+ + O_2 + 4e \rightarrow 2H_2O$). The water is removed from the fuel cell 10.

FIG. 2 illustrates a prior art fuel cell stack 30. Each cell 32 in the stack is formed of a plurality of chambers 34 filled with a fuel ($H_2$) separated from a plurality of chambers 36 filled with an oxidant ($O_2$) by a membrane 37. A manifold/electrode 38 performs two functions: (1) it forms two sets of chambers (one set of chambers 34 filled with fuel for a first cell and the other set of chambers 36 filled with oxidant for a second, adjacent cell) and (2) it acts as an electrode associated with each set of chambers.

In operation, each pair of chambers 34 and 36 separated by a membrane 37 operates as described in connection with FIG. 1.

The manifold/electrode 38 is typically machined from graphite. Graphite has excellent conductivity, but is very expensive.

FIG. 3 illustrates a cross sectional view of a manifold/electrode 40 which can be used in place of manifold electrode 38. The structure of manifold/electrode 40 is formed from a lightweight, inexpensive material, such as a plastic, metal, ceramic or polymeric material. The outer dimensions of the manifold/electrode 40 can be the same as manifold/ electrode 38. In the preferred embodiment, the manifold/ electrode 40 is formed as a wall 42 of plastic or polymeric material, with the inside being hollow to reduce weight.

Since the manifold/electrode 40 must be conductive to pass the electrons, a plurality of conductive vias 44 are formed through the wall 42 and the outer surface is coated with a conductive layer 46. A catalyst can cover the manifold/electrode, as in the prior art.

The embodiment shown in FIG. 3 provides significant advantages over the manifold/electrode 30 in FIG. 2. First, manifold/electrode 40 is significantly cheaper because it is made from inexpensive materials, rather than graphite. Second, manifold/electrode 40 can be fabricated in mass quantities using well known and inexpensive molding processes, rather than machining a graphite slab, which is more expensive and wastes the expensive graphite material. Third, the manifold/electrode 40 can be made hollow, reducing weight, which is important for use with portable electronic devices.

FIG. 4 illustrates a cross-sectional view of a manifold/ electrode 50 which can be used to significantly decrease the depth of a fuel cell stack, while also reducing weight and costs. As with the previous figures, manifold/electrode 50 provides a structure for two sets of chambers, a set of fuel chambers 34 and a set of oxidant chambers 36. The two sets of chambers are associated with adjacent cells in a fuel cell stack (see FIG. 6). However, the serpentine shape of the manifold/electrode 50 provides two sets of interleaved chambers, such that the depth of the fuel chambers 34 overlaps the depth of the oxidant chambers 36. Since the fuel chambers 34 and oxygen chambers 36 are co-linear, or substantially co-linear, across the manifold/electrode 50, the depth of the manifold/electrode, and hence the fuel cell stack, is greatly reduced.

While manifold/electrode 50 could be formed out of a conventional material such as graphite, in the preferred embodiment, it is formed of wall 51 of low weight plastic, ceramic, metal or polymer material, using conductive vias 52 and a conductive coating 54 to pass electrons.

The difference in depth between manifold 50 and manifold 38 is shown in connection with FIGS. 5a and 5b. The depth of the fuel and oxidant chamber is given as "a", where the thickness of the wall between chambers is given as "b." The thickness of the wall of manifold 50 is also given as "b." As shown in FIG. 5a, the depth of manifold 50 is equal to a+b. In FIG. 5b, the depth of manifold 38 is equal to 2a+b. Therefore, for a fuel cell stack of five cells, the difference in height would be equal to 5a. For a thirty cell stack, such as used in the Gemini space craft, the difference would be 30a.

In addition to reducing depth, the manifold/membrane 50 uses less material than the manifold/membrane 38, and is thus less expensive and lighter.

FIG. 6 illustrates a fuel cell stack 60 using the manifolds 50 of FIGS. 4 and 5. Each cell 32 in the stack 60 is formed of a plurality of chambers 34 filled with a fuel ($H_2$) separated from a plurality of chambers 36 filled with an oxidant ($O_2$) by a membrane 37. As can be seen, the cells 32 of the stack 60 overlap due to the overlapping configuration of the chambers 34 and 36. Accordingly, the size overall depth of the stack 60 is reduced.

FIG. 7 illustrates an embodiment of a power assembly 62 incorporating fuel stack 60 for use in connection with a portable computer or other portable electronic device. In this embodiment, the fuel cell stack 60 receives $O_2$ from the air through pump 64 and fuel from a fuel cartridge 66. The water waste is stored in a reservoir 68 which may be emptied by the user.

One embodiment of a fuel cartridge 66 is a metal can containing a powdered alloy such as $CaNi_5$ or $MmNi_{4.5}Mn_{0.5}$ metal hydride cartridge. Metal hydride will adsorb hydrogen at 1% or 2% by weight and release the hydrogen to the chambers 34 of the fuel cell stack 60. A cartridge of this type can be recharged by a commercial firm or by a user using a portable electrolyzer.

FIG. 8 illustrates an embodiment of a power assembly disposed within the housing of a notebook computer 70. The fuel cartridge 66 is accessible to the exterior of the notebook 70 for easy replacement. The fuel cell stacks 60 are located behind the fuel cartridge 66. The pump 64 is located to the side of the notebook computer housing and pumps air from a hole 72 in the housing. The reservoir is located next to the pump and can release the water through a plug on the bottom of the housing (not shown). The output of the fuel cells powers the processing circuitry 74 and display 76. The computer 70 may also contain a small battery for powering the pump 64 at start-up, or air convection could be used to gradually build up the power output of the fuel cell 60.

In operation, the power assembly 70 will provide power to the processing circuitry and display so long as fuel remains in the fuel cartridge. Periodically, the water must be removed from the reservoir 68. When the fuel is low, the cartridge 66 can be removed from the housing and recharged or replaced with a full fuel cartridge. The fuel cell stacks 60 never need to be removed from the computer. Thus, the only waste from the system is pure water.

The fuel cell stack of the present invention provides significant advantages over the prior art. First, because chambers for adjacent cells are not additive in depth, the thickness of the fuel cell stack can be greatly reduced, making them appropriate for use in portable electronics. Second, the weight of a fuel cell stack is reduced. Third, the manifolds can be cheaply manufactured from a plastic material with conductive vias formed therethrough.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A fuel cell stack comprising:
   a plurality of manifolds, each manifold formed of plastic with conductive vias formed through said plastic and forming a plurality of adjacent overlapping chambers, such that the depth of chambers for adjacent cells is not additive;
   membranes disposed between manifolds; and
   chemical sources to provide chemicals to said chambers.

2. The fuel cell stack of claim 1 wherein said manifold further comprises a conductive layer formed over said plastic.

3. The fuel cell stack of claim 1 wherein said manifold is formed of molded plastic.

4. A fuel cell stack comprising:
   a plurality of metal manifolds, each manifold forming a plurality of adjacent overlapping chambers, such that the depth of chambers for adjacent cells is not additive;
   membranes disposed between manifolds; and
   chemical sources to provide chemicals to said chambers.

5. A fuel cell stack comprising:
   a plurality of ceramic manifolds, each manifold forming a plurality of adjacent overlapping chambers, such that the depth of chambers for adjacent cells is not additive;

membranes disposed between manifolds; and chemical sources to provide chemicals to said chambers.

6. A fuel cell stack comprising:

a plurality of polymer manifolds, each manifold forming a plurality of adjacent overlapping chambers, such that the depth of chambers for adjacent cells is not additive;

membranes disposed between manifolds; and chemical sources to provide chemicals to said chambers.

7. A fuel cell stack comprising:

a plurality of manifolds, each manifold having a hollow interior and forming a plurality of adjacent overlapping chambers, such that the depth of chambers for adjacent cells is not additive;

membranes disposed between manifolds; and chemical sources to provide chemicals to said chambers.

8. A fuel cell stack comprising:

a plurality of manifolds, each manifold formed of one of plastic, metal, ceramic and polymer and each forming a plurality of adjacent overlapping chambers, such that the depth of chambers for adjacent cells is not additive;

membranes disposed between manifolds; and chemical sources to provide chemicals to said chambers.

9. The fuel cell stack of claim 8 wherein said chemical sources comprising a hydrogen source and an oxygen source.

10. The fuel cell stack of claim 9 wherein said hydrogen source comprises a container of metal hydride material with adsorbed hydrogen.

11. The fuel cell stack of claim 9 wherein said oxygen source comprises air.

12. The fuel cell stack of claim 9 wherein said oxygen source comprises a pump for supplying air through one set of chambers.

13. A portable electronic device comprising:

processing circuitry; and a fuel cell stack for providing electricity to said processing circuitry, said fuel cell stack comprising:

a plurality of manifolds, each manifold forming a plurality of adjacent overlapping chambers, such that the depth of chambers for adjacent cells is not additive; and membranes disposed between manifolds; and chemical sources to provide chemicals to said chambers.

14. A portable electronic device comprising:

processing circuitry; and a fuel cell stack for providing electricity to said processing circuitry, said fuel cell stack comprising:

a plurality of serpentine manifolds, each manifold forming two sets of interleaved chambers associated with adjacent fuel cells, such that chambers for adjacent cells are at least partially co-linear;

membranes disposed between manifolds; and chemical sources to provide chemicals to said chambers.

15. A manifold for use in a fuel cell stack, comprising:

a wall formed of a dielectric material defining first and second sets of chambers;

conductive vias disposed through said wall for passing electrical current.

16. The manifold of claim 15 and further comprising a conductive layer formed over an exterior wall.

17. The manifold of claim 15 wherein said wall forms a hollow interior between said chambers.

18. The manifold of claim 15 wherein said dielectric material is plastic.

19. The manifold of claim 15 wherein said dielectric material is ceramic.

20. The manifold of claim 15 wherein said dielectric material is a polymer material.

* * * * *